Z. B. CUSTER.
WHEEL.
APPLICATION FILED MAY 8, 1915.
1,150,103. Patented Aug. 17, 1915.
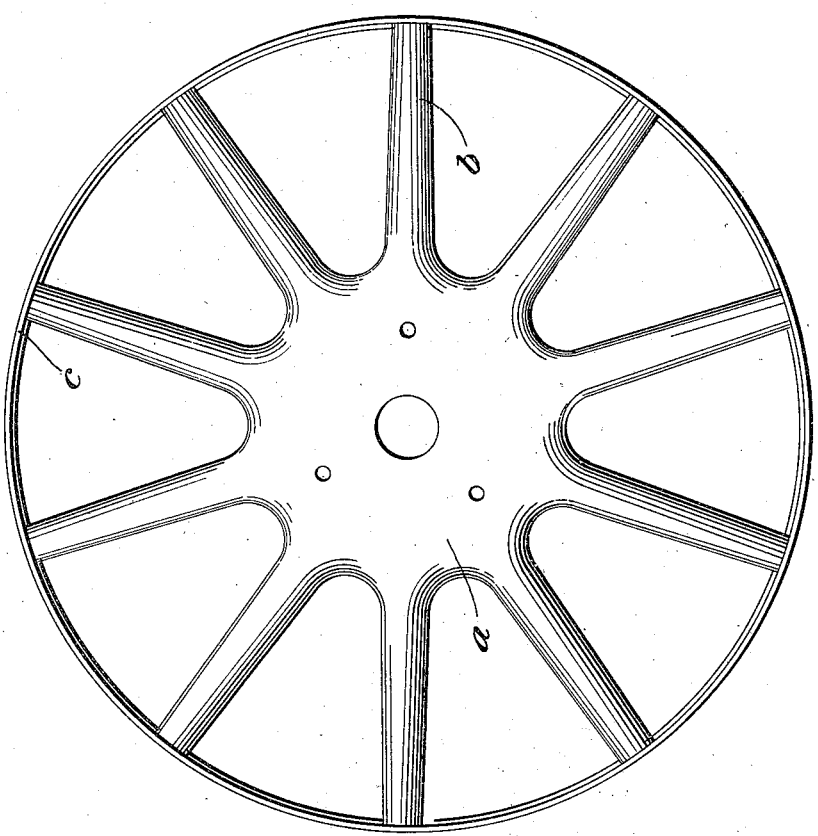
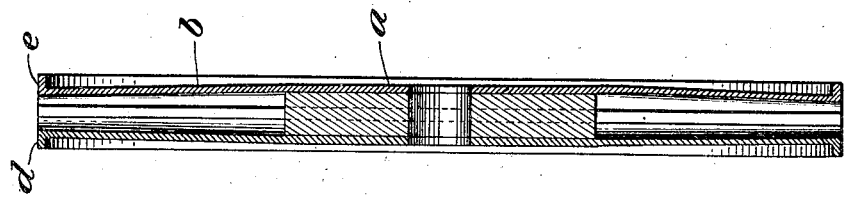
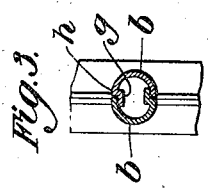
Inventor:
Zora B. Custer.

UNITED STATES PATENT OFFICE.

ZORA B. CUSTER, OF BRADFORD, PENNSYLVANIA.

WHEEL.

1,150,103.

Specification of Letters Patent.

Patented Aug. 17, 1915.

Application filed May 8, 1915. Serial No. 26,865.

*To all whom it may concern:*

Be it known that I, ZORA B. CUSTER, citizen of the United States, residing at Bradford, Pennsylvania, have invented certain new and useful Improvements in Wheels, of which the following is a specification.

My invention relates to stamped wheels, and is designed to produce a wheel made up of two parts complementary to each other, each part made of a single stamping, and the parts held together by being welded.

In the accompanying drawing, Figure 1 is a face view of my improved stamped wheel; Fig. 2 is a section through the center of the same; and Fig. 3 is a section through one of the spokes.

In carrying out my invention, I produce the wheels minus the rim, this being added according to the particular requirement of the purchaser, my output simply consisting as a new article of manufacture of the stamped wheel in two parts, welded together, capable of receiving any sort of a rim.

As shown in Figs. 1 and 2, I form the wheel of two parts, each part consisting of a center $a$ having half spoke sections $b$, the spoke sections being connected by rim sections each having outwardly extending flanges $d$ and $e$. This forms a very strong construction, as the spoke sections are arched, as shown in Fig. 3, and form firm supports for the rim sections, and in combining the two halves of the wheel I weld the abutting edges $f$ of the adjacent rim sections $d$, $e$.

I stamp out the spoke sections as shown in Fig. 3, each section $b$ being practically of U-shape with one edge provided with an offset and a shoulder into which fits the plain edge of the opposite spoke portion. The offset is shown at $g$, and the shoulder at $h$. In this way a perfectly smooth exterior is provided for the spoke sections, and I secure the spoke sections together by welding.

By having the two wheel members exact duplicates it is possible to form a number of parts from one set of dies, any two of which can be assembled to form a complete wheel. The spoke construction comprising an inner offset and shoulder at one side and a plain edge at the other, not only enables this use of complementary parts throughout but results in a stronger and neater wheel than could otherwise be made.

It will thus be seen that I secure a very attractive wheel, and one of very great strength, in which the two main factors are stamped sections welded together, the rim sections being made integral with the spoke sections and welded so as to practically form a single structure. Of course any form of rim may be used with this wheel, and any form of hub construction may be utilized.

I claim as my invention:—

In a stamped wheel, two parts made complementary one to the other, and each part comprising an integral hub section, spoke section, and rim section, the spoke sections having an offset and shoulder on one inner edge fitting a plain part of the opposite spoke section to present, when the parts are assembled, a continuous uninterrupted exterior surface, and means for securing the parts together, substantially as described.

In testimony whereof, I affix my signature in presence of two witnesses.

ZORA B. CUSTER.

Witnesses:
F. L. MIDDLETON,
BENNETT L. JONES.